MULTIMODE OPTICAL AMPLIFIER

Filed Dec. 27, 1967

INVENTOR
S. E. MILLER
BY
Sylvan Sherman
ATTORNEY

United States Patent Office 3,426,286
Patented Feb. 4, 1969

3,426,286
MULTIMODE OPTICAL AMPLIFIER

Stewart E. Miller, Locust, N.J., assignor to Bell Telephone Laboratories, Incorporated, Murray Hill, N.J., a corporation of New York

Filed Dec. 27, 1967, Ser. No. 693,910
U.S. Cl. 330—4.3 8 Claims
Int. Cl. H01s *3/00;* H03f *7/00, 3/60*

ABSTRACT OF THE DISCLOSURE

A multimode laser amplifier is coupled to a plurality of auxiliary cavities which are adapted to control the gains of a plurality of transverse propagating modes. This arrangement can be adapted to be used either as a linear amplifier or as a mode-locked, phase-locked oscillator. In these arrangements, wave energy converted to higher order modes, due to distortion in the transmission medium need no longer be lost to the system. Sensitive receivers using the above-described amplifiers are also described.

This invention relates to apparatus for amplifying an electromagnetic beam containing a plurality of propagating modes.

*Background of the invention*

The recent invention of the optical maser and the increasing need for communications systems with high information carrying capacities have led to greatly increased efforts to develop an optical communications system. (See, for example, S. E. Miller, Communications by Laser, Scientific American, 214: 19, January 1966.)

One problem that arises in an optical communications system, based upon either amplitude or pulse code modulation, is that beam distortion limits the performance of conventional optical receivers. In a typical proposed laser communications system, the transmitting laser is adapted to emit a beam in only the first order transverse mode. However, the beam is distorted by the transmission medium coupling the transmitter to the receiver resulting in the generation of higher order spurious modes. Because of this distortion, it is difficult to amplify and detect the laser signal beam in the conventional manner. For example, a conventional optical amplifier will amplify only the lowest order mode. Thus a significant amount of signal power is lost and the signal-to-noise ratio of the receiver is degraded.

*Summary of the invention*

In accordance with the present invention, the wave energy associated with the higher order, spurious modes is preserved and amplified by means of a laser amplifier having one or more auxiliary cavities. The auxiliary cavities, which are coupled to the main amplifier cavity, are provided with means for independently controlling the gain of each of the modes. The number of auxiliary cavities provided depends upon the number of modes containing significant amounts of wave energy, and will vary from system to system.

It is an advantage of the present invention that the preservation of the higher order modes increases the total signal energy at the receiver detector, resulting in an improved receiver noise performance. Two receiver embodiments are described.

*Brief description of the drawings*

The invention and its object and advantages will be more clearly understood from the following detailed description taken in conjunction with the drawings in which.

*Detailed description*

Figures 1A, 1B:
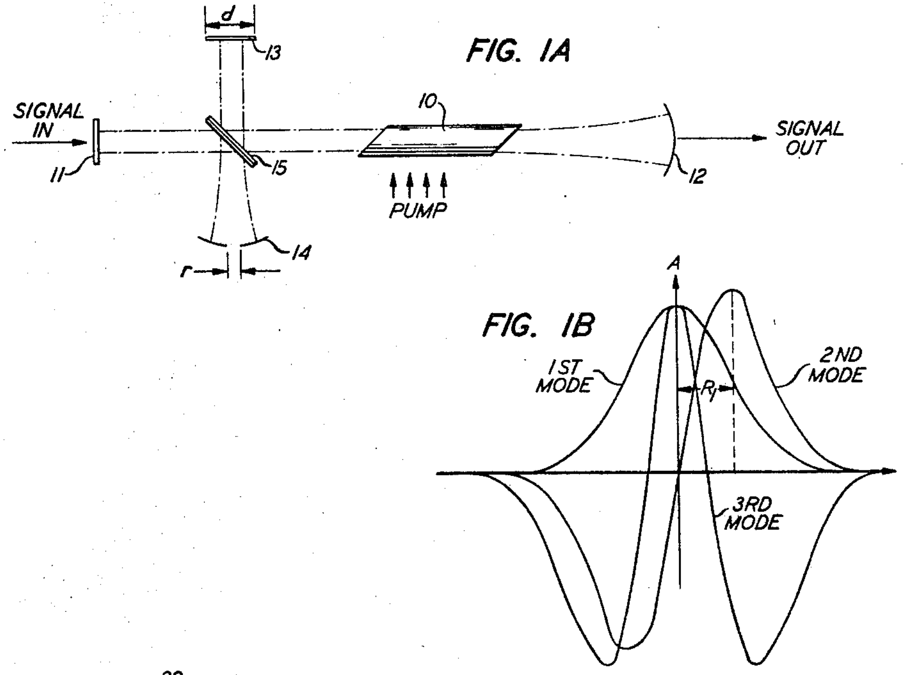
FIG. 1A shows an illustrative embodiment of a two-mode laser amplifier or oscillator in accordance with the invention.
FIG. 1B included for purposes of explanation, shows the electric field distribution for the first three modes.

In FIG. 1A there is shown a two-mode laser amplifier (or oscillator) comprising a body of active laser material 10 energized by a pumping source (not shown), mirrors 11, 12, 13 and 14, adapted to form a pair of half-confocal cavities, and a beam splitter 15 adapted to couple beam energy between the two cavities. The spacings between the mirrors of the two cavities are chosen to produce resonance at the desired frequency. The first half-confocal cavity, formed by plane mirror 11 and spherical mirror 12, includes means for coupling the signal beam into and out of the structure. For example, mirror 11 can be a partially transparent mirror, permitting signal energy to be coupled into the amplifier, and mirror 12 can be a partially transparent mirror permitting the amplified signal to be coupled out. In addition, in this particular embodiment, laser material 10 is disposed within this cavity. Plane mirror 13, and spherical mirror 14 form the second half-confocal cavity.

In addition to forming a half-confocal cavity, mirrors 13 and 14 are adapted to control the gain of the first and second order modes of the signal beam. The means for accomplishing this control can be more easily understood by reference to FIG. 1B which shows the field distributions of the first three transverse modes. More specifically, FIG. 1B shows plots of the electric field amplitude A as a function of the radial distance R from the beam center. (For a mathematical analysis of the field distributions of the various transverse modes, see, for example, Boyd and Gordon, Confocal Multimode Resonator for Millimeter Through Optical Wavelength Masers, 40 Bell System Technical Journal, 489, March 1961.) It will be noted that the first order mode is characterized by a strong peak at $R=0$. The loaded Q of the multiple cavity structure for the mode can thus be controlled by suitably limiting the radius $r$ of a centrally located absorbing region such as an aperture in mirror 14. The second order mode, on the other hand, has a zero amplitude at $R=0$ and an amplitude extrema at $R=R_1$. Thus, the second order mode is relatively unaffected by the aperture in mirror 14 so long as $r$ is small compared to $R_1$. In general, the loaded Q of the structure for the first order mode is typically higher than that for the second order mode, thus the relative Q's and, hence, the net gains of the first two modes can be equalized by the proper choice of $r$.

It will also be noted from FIG. 1B that the higher the mode order, the farther the energy is spread from the beam center. Thus, higher order modes can be suppressed by an absorbing iris having an opening sufficiently small that much of the higher mode energy is lost, but sufficiently large so that most of the lower mode energy is retained. For example, this can be accomplished by choosing the diameter of mirror 13 to be approximately $4R_1$.

This apparatus can be made to operate either as a linear amplifier or as a mode-locked, phase-locked oscillator, depending upon the amount of laser active material present in body 10. When the apparatus is operated as a linear amplifier, a multimode signal beam entering the structure through mirror 11 is coupled to both cavities by beam splitter 15. Mirrors 13 and 14 control the gain of the first and second order moles and simultaneously suppress the gain of higher order modes. Amplification is produced in the usual manner, and the amplified two-mode signal is coupled out of the cavity through mirror 12.

When the device is to be operated as a phase-locked oscillator, oscillating conditions are established. In the absence of an input signal, the apparatus oscillates in a random combination of the two modes. However, in the presence of an input locking signal, the ratio of the two oscillating modes is fixed by the ratio of the two modes in the input locking signal.

The advantage of using a two-mode laser amplifier rather than a conventional laser is that the signal energy coupled into the second order mode is preserved. It can be shown that preserving this portion of the signal enables one to obtain a higher noise factor at the receiver than would be obtained were this energy lost.

Figure 2:
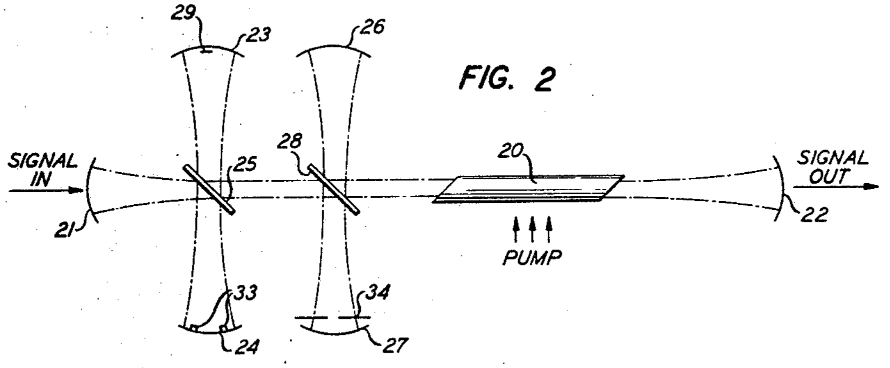
FIG. 2 is a three-mode optical amplifier or oscillator in accordance with the invention.

In FIG. 2 there is shown a three-mode laser amplifier comprising a body of active laser material 20 coupled to a pumping source (not shown), spherical mirrors 21, 22, 23, 24, 26 and 27 adapted to form three confocal cavities, and a pair of beam splitters 25 and 28 adapted to couple beam energy among the three cavities. The first confocal cavity, formed by mirrors 21 and 22, includes means for coupling the signal beam into and out of the structure. In addition, laser material 20 and both beam splitters 25 and 28 are disposed within this cavity. Mirrors 23 and 24 are adapted to form the second confocal cavity and mirrors 26 and 27 form the third confocal cavity.

In addition to forming a pair of confocal cavities, mirrors 23, 24, 26 and 27 are adapted to control the gain of the first three modes of a multimode signal beam and to suppress higher order modes. For example, a spot of absorbing material 29 having a radius $r$ is placed in the center of mirror 23. If $r$ is sufficiently smaller than $R_1$ of FIG. 1B, energy is absorbed from the first and third modes without affecting the second mode. A ring 33 of absorbing material having an inner radius equal to $R_1$ placed on mirror 24, for example, absorbs much energy from the second order mode but very little from the first and third modes. An iris 34 associated with mirror 27 can be used to suppress higher order modes. In one application of the invention, the dimensions of these absorbing regions are adjusted so that the gains of both the first and second modes are equal to that of the third mode. The operation of the amplifier is similar to that of the two-mode amplifier described in connection with FIG. 1A. It can also be used as a three-mode, phase-locked oscillator.

Obviously the principles of the invention permit the construction of higher order multimode amplifiers. In general, an $n$-mode amplifier can be constructed by providing $n$-coupled cavities and means for controlling the relative gains of the several modes by means of absorbing spots, ring, apertures and the like located on the mirrors forming the auxiliary cavities.

Figure 3:
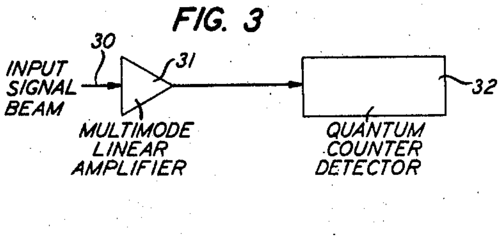
FIG. 3 shows, in block diagram, an optical receiver using a multimode amplifier in accordance with the invention.

In accordance with a second aspect of the invention, it is found that the preservation of the higher mode signal energy by a multimode amplifier permits the construction of more sensitive optical receivers. For example, FIG. 3 shows a schematic diagram of an optical receiver for amplitude modulation signals. More specifically, the receiver comprises a multimode optical amplifier 31 having its output coupled to a conventional quantum counter detector 32. (For a description of this type of detector, see M. V. Schneider, Schottky Barrier Photodiodes with Antireflection Coating, 45 Bell System Technical Journal 1611, November 1966.)

In operation, a multimode amplitude-modulated signal beam 30 is coupled into multimode amplifier 31 where it is amplified. The amplified multimode signal is then coupled into quantum detector 32 where it is converted into an electrical signal. The increased sensitivity of this device is due to the fact that the preservation of the higher mode signal energy produces a higher ratio of signal and signal shot noise to thermal noise at the detector output.

Figure 4:
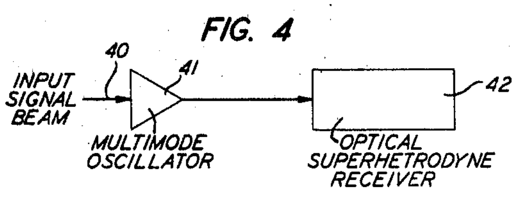
FIG. 4 shows, in block diagram, an optical superheterodyne receiver using a multimode oscillator.

As a second example, FIG. 4 shows a schematic diagram of a more sensitive optical receiver for a phase or frequency modulated signal beam. In essence, the receiver comprises a mode-locked, phase-locked multimode oscillator 41 having its output coupled to an optical superheterodyne receiver. (For a description of optical superheterodyne receivers, see J. R. Kerr, Microwave-Bandwidth Optical Receive Systems, 55 Proc. IEEE 1686, October 1967.)

In operation, a multimode phase or frequency-modulated optical signal beam 40 is coupled into multimode oscillator 41. The input signal locks both the mode distribution and the frequency of the oscillator and is thus effectively amplified. The amplified signal is then coupled to the superheterodyne receiver 42 and converted into a modulated electrical signal. The increased sensitivity is due to the fact that the preservation of the higher mode signal energy permits a reduction in the level of the local oscillator signal. In fact, the input signal can be higher than the local oscillator, thus substantially reducing the shot noise due to the local oscillator.

It is understood that the above-described arrangements are illustrative of only a small number of many possible specific embodiments which can represent applications of the principles of the invention. Numerous and varied other arrangements can be readily devised in accordance with these principles by those skilled in the art without departing from the spirit and scope of the invention.

What is claimed is:

1. A device for amplifying an optical signal containing a plurality of propagating modes comprising:

a laser, including an active medium disposed within a first resonant cavity;

at least one auxiliary cavity, including means for controlling the gains of each of said modes to be amplified optically coupled to said first cavity;

and means for coupling optical wave energy into and out of said device.

2. A device according to claim 1 adapted to produce linear amplification.

3. A device according to claim 1 adapted to produce oscillations.

4. A device according to claim 1 wherein the number of auxiliary cavities is one less than said number of modes to be amplified.

5. A device according to claim 1 wherein:

the number of auxiliary cavities is one less than said number of modes to be amplified;

and said means for controlling the gains of each of said modes comprises means associated with said auxiliary cavities for equalizing the gain of said modes to be amplified.

6. A device according to claim 1 wherein:

said optical signal includes the first and second order propagating modes;

said auxiliary cavity comprises a pair of axially symmetric reflective means;

and said means for controlling the gain of said first two modes comprises an absorbing region, centrally located on one of said reflective means, having a sufficiently large area to control the gain of the first order mode, and an absorbing iris, centrally located on one of said reflective means, having a sufficiently small opening to control the gain of the second order mode.

7. An optical receiver comprising:

a multimode linear amplifier according to claim 2;

and a quantum counter detector optically coupled to the output of said amplifier.

8. An optical receiver comprising:

a multimode oscillator according to claim 3;

and an optical superheterodyne receiver optically coupled to the output of said oscillator.

References Cited

UNITED STATES PATENTS 3,187,270 6/1965 Kogelnik et al. ------ 331—94.5

ROY LAKE, *Primary Examiner.*

DARWIN R. HOSTETTER, *Assistant Examiner.*

U.S. Cl. X.R.

330—56, 4.5; 331—94.5, 96; 333—83; 329—192; 250—199